(12) United States Patent
Huang

(10) Patent No.: US 11,950,707 B2
(45) Date of Patent: Apr. 9, 2024

(54) DETACHABLE CHAIR LEG AND CHAIR

(71) Applicant: ANJI HENGFENG METAL DIE-CASTING CO., LTD., Dipu Town (CN)

(72) Inventor: Yiqun Huang, Dipu Town (CN)

(73) Assignee: ANJI HENGFENG METAL DIE-CASTING CO., LTD., Zhejiang Province (CN)

( * ) Notice: Subject to any disclaimer, the term of this patent is extended or adjusted under 35 U.S.C. 154(b) by 408 days.

(21) Appl. No.: 17/289,096

(22) PCT Filed: Jun. 25, 2019

(86) PCT No.: PCT/CN2019/092707
§ 371 (c)(1),
(2) Date: Apr. 27, 2021

(87) PCT Pub. No.: WO2020/232793
PCT Pub. Date: Nov. 26, 2020

(65) Prior Publication Data
US 2022/0000267 A1    Jan. 6, 2022

(30) Foreign Application Priority Data

May 20, 2019    (CN) .......................... 201910418640.7

(51) Int. Cl.
*A47C 7/02*    (2006.01)
*A47C 7/00*    (2006.01)

(52) U.S. Cl.
CPC ................... *A47C 7/004* (2013.01)

(58) Field of Classification Search
CPC .................................................. A47C 7/004
See application file for complete search history.

(56) References Cited

U.S. PATENT DOCUMENTS

| | | | |
|---|---|---|---|
| 602,489 A * | 4/1898 | Trapp ....................... | A47C 3/24 248/406.1 |
| 2,342,233 A * | 2/1944 | Wood ..................... | A47C 7/004 248/188.7 |

(Continued)

FOREIGN PATENT DOCUMENTS

| CN | 2762651 Y | 3/2006 |
|---|---|---|
| CN | 204378535 U | 6/2015 |

(Continued)

OTHER PUBLICATIONS

PCT International Search Report for PCT International Application No. PCT/CN2019/092707.

(Continued)

*Primary Examiner* — Philip F Gabler
(74) *Attorney, Agent, or Firm* — Olive Law Group, PLLC

(57) ABSTRACT

The present disclosure relates to a detachable chair leg and a chair. The chair includes feet and a central support. The central support includes a support body and a plurality of mount portions, one side of the foot is provided with a mount groove. The mount portion is horizontally embedded in the mount groove, and a fastening assembly is provided between the foot and the central support to prevent the mount portion from removing laterally from the mount groove. The mount portion is provided with first limit portions, the foot is provided with second limit portions, at least one first limit portion is located at the outer side of the second limit portion along a longitudinal direction, the first limit portions and the second limit portions cooperate to form a longitudinal limit structure that prevents the foot from being separated from the mount portion in the longitudinal direction.

8 Claims, 4 Drawing Sheets

(56) References Cited

U.S. PATENT DOCUMENTS

| | | | | | |
|---|---|---|---|---|---|
| 3,443,782 | A | * | 5/1969 | Fields | A47C 7/004 248/188.7 |
| 4,821,986 | A | * | 4/1989 | White | A47B 13/023 248/188.7 |
| 5,673,892 | A | * | 10/1997 | Kjellman | A47C 7/004 248/188.7 |
| 5,938,156 | A | * | 8/1999 | Kao | A47C 7/004 248/188.7 |
| 11,419,420 | B1 | * | 8/2022 | Wu | F16M 11/20 |
| 11,602,218 | B2 | * | 3/2023 | Kjellman | A47B 91/005 |
| 2015/0122958 | A1 | * | 5/2015 | Chen | A47C 7/004 248/158 |

FOREIGN PATENT DOCUMENTS

| | | | |
|---|---|---|---|
| CN | 107007059 | A | 8/2017 |
| CN | 206560195 | U | 10/2017 |
| WO | 9632866 | A1 | 10/1996 |

OTHER PUBLICATIONS

PCT Written Opinion for PCT International Application No. PCT/CN2019/092707.

* cited by examiner

DETACHABLE CHAIR LEG AND CHAIR

CROSS REFERENCE TO RELATED APPLICATIONS

This is a national phase application of PCT Application No. PCT/CN2019/092707, filed Jun. 25, 2019, which claims priority to Chinese Patent Application No. 2019104186407, filed May 20, 2019, the contents of which are incorporated herein by reference in their entireties.

TECHNICAL FIELD

The present disclosure relates to the technical field of chairs, and in particular, to a detachable chair leg and a chair.

BACKGROUND

The existing chair legs are usually integrally formed plastic parts or metal parts, but the integrally formed chair legs have the problem of difficulty in processing. Due to the large size and complex structure of the chair legs, the processes, such as injection molding and casting molding or the like, take a long time, the mechanical cold working process is complex, and the production efficiency is low. In addition, since the chair legs occupy a large space, the cost of packaging and transportation is high.

For example: the Chinese utility model patent with application number 201020672820.2 discloses an easily disassembled chair leg, it includes a steam pressure rod support block and at least three leg branches. The steam pressure rod support block is used to support the steam pressure rod of the seat, a seat cushion and the above parts. The leg branches are distributed around the support block of the steam pressure rod for direct contact with the ground. The support block of the steam pressure rod is provided with a cantilever with a hook at the end, which is respectively embedded in the groove provided with the toe, and the two parts are combining to form a stressed chair leg structure. The shortcomings are that the branches and the steam pressure rod support block are only connected by the cantilever embedded in the groove. This connection method is not stable enough and the cantilever is easily detached from the groove.

SUMMARY

In one aspect, the first object of the present disclosure is to provide a detachable chair leg to improve the stability of the connection between the feet and the central support.

The above-mentioned object of the present disclosure is achieved through the following technical solutions: a detachable chair leg comprises a plurality of feet and a central support, the central support includes a support body and a plurality of mount portions fixedly connected to the support body; each of the plurality of feet is provided with a mount groove on one side of the foot; the mount portion is horizontally embedded in the mount groove, and between the each of the plurality of feet and the central support, a fastening assembly is provided to prevent each of the plurality of mount portions from being laterally separated from the mount groove; the each of the plurality of mount portions is provided with a plurality of first limit portions; the foot is provided with a plurality of second limit portions, at least one of the plurality of the first limit portions is located outside the second limit portions in a longitudinal direction; the limit portions cooperates with the second limit portions to form a longitudinal limit structure that prevents the foot from removing from the mount portion in the longitudinal direction.

In a preferred embodiment, the second limit portions are provided on groove walls on two sides of the mount groove, and the first limit portions are fixed on corresponding two sides of the mount portion.

In a preferred embodiment, at least two first limit portions are provided along the longitudinal direction, and at least one second limit portion is clamped between two adjacent first limit portions.

In the longitudinal direction, the second limit portion is clamped between two adjacent first limit portions, so that the foot cannot move in the longitudinal direction, and the foot is prevented from being separated from the central support in the longitudinal direction.

In a preferred embodiment, a notch of the mount groove is downward along an axial direction of the support body, and the foot is buckled on the mount portion from top to bottom via the mount groove.

In a preferred embodiment, the central support further comprises a support portion for supporting under the foot, the support portion is arranged below the mount portion.

In a preferred embodiment, the fastening assembly comprises a bolt and a threaded connection part with an internal threaded hole; the threaded connection part is provided on the foot, the bolt passes through the central support from below and then is screwed to the threaded connection part.

In a preferred embodiment, the threaded connection part is provided in the mount groove; the mount portion is provided with a bolt positioning portion abutting on an end of the threaded connection portion, the bolt positioning portion is provided with an axially penetrating through hole, and the through hole is communicated with the internal threaded hole.

In a preferred embodiment, an outer wall of the support body is provided with a plurality of guide portions, and each of the guide portion extends axially to the mount portion from an upper end of the support body; an end of the foot is provided with a slide groove that moves axially along the guide portion.

During installation, since the second limit portion is located in the mount groove, it is not easy to observe whether the second limit portion is accurately clamped between the two first limit portions. Therefore, the foot can be accurately make the second limit portion installed to the corresponding position through matching the slide groove and the guide portion, such that the difficulty of installation can be reduced.

In a preferred embodiment, the mount groove is provided with guide blocks for clamping on both sides of the guide portion, a space located between two adjacent guide blocks is the slide groove; the bolt positioning portion is provided on an outside of the guide portion, and the guide blocks are fixed between the support body and the bolt positioning portion in a radial direction.

Since the guide blocks are fixed between the support body and the bolt positioning portion, the foot is further limited and fixed in the radial direction, that is, in the longitudinal direction of the foot.

In another aspect, the second object of the present disclosure is to provide a chair, to the stability of the connection between the feet and the central support.

The above-mentioned object of the present disclosure is achieved by the following technical solutions: a chair comprises a chair leg according to any one of the above-mentioned solutions.

Beneficial Effect

1. The present disclosure has simple structure, easy disassembly and assembly, and saves transportation costs;
2. The feet are firmly connected with the central support, and adopt fixed and limit structures in both the horizontal and longitudinal directions, such that they are not easy to fall off and shake;
3. The cooperation of the slide groove and the guide portions can accurately install the second limit portions to the corresponding position, reducing the difficulty of installing the foot.

Figure 1:
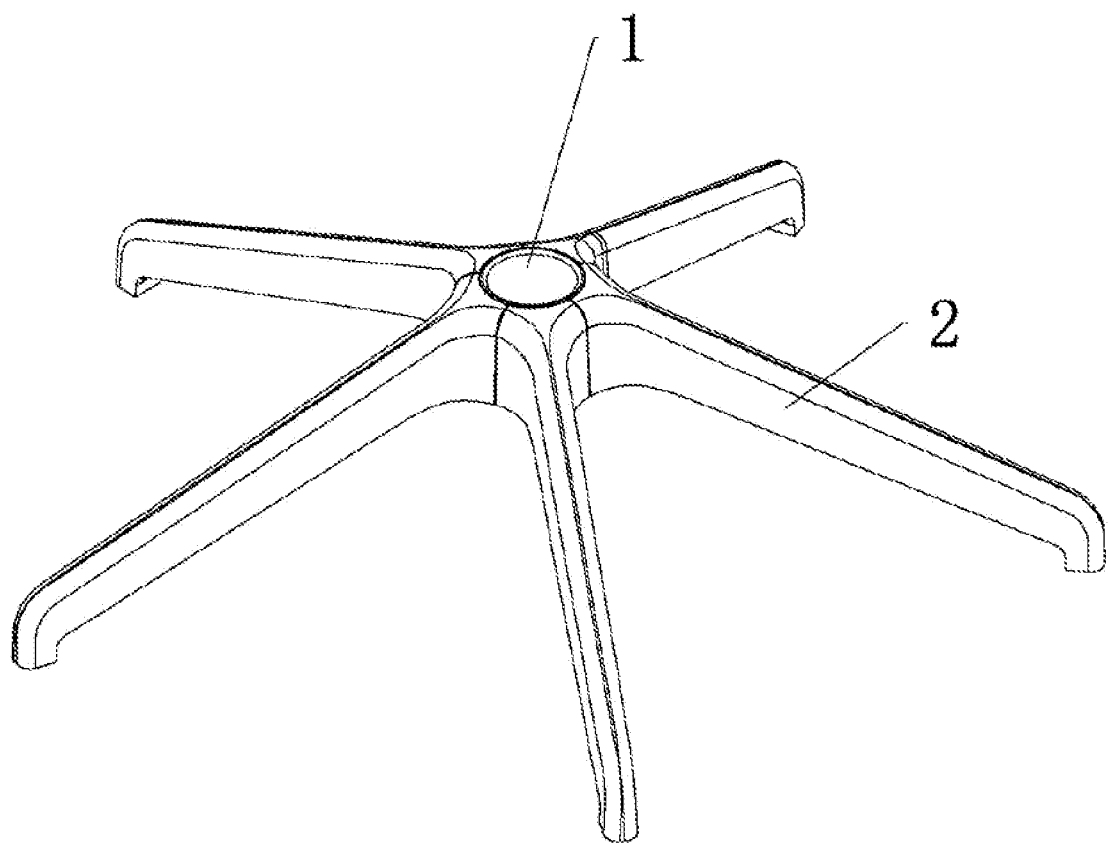
FIG. 1 is a schematic structural diagram illustrating a chair leg according to an embodiment of the present disclosure.
Figure 2:
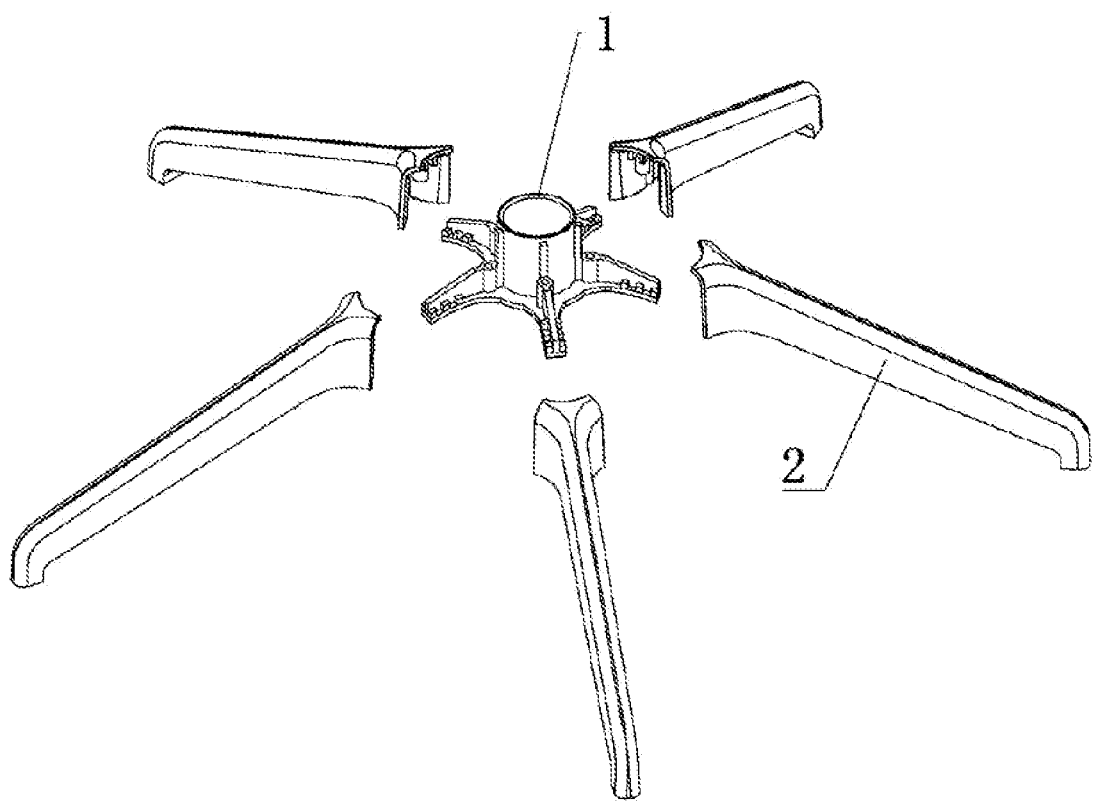
FIG. 2 is an exploded view illustrating a chair leg according to an embodiment of the present disclosure.

In the figures: 1—central support, 11—support body, 12—support portion, 13—mount portion, 14—first limit portion, 15—bolt positioning portion, 16—guide portion, 17—center hole, 2—foot, 21—mount groove, 22—second limit portion, 23—guide block, 24—slide groove, 25—threaded connection portion.

DESCRIPTION OF EMBODIMENTS

The present disclosure will be further described in detail below in combination with the accompanying drawings.

The specific embodiment is only an explanation of the present disclosure, and is not a limitation of the present disclosure. After reading this specification, those skilled in the art can make modifications to this embodiment without inventive contribution as needed, but they will be protected by patent law as long as they fall within the scope of the claims of the present disclosure.

Embodiment

As shown in FIGS. 1 to 4, a detachable chair leg may include a plurality of feet 2 and a central support 1. The center of the central support 1 may be provided with a central hole 7 for inserting a support rod. The number of feet 2 may be three to six, in this embodiment, five feet are provided and distributed around the outside of the central support 1. The longitudinal direction (ie, the length direction) of the foot 2 points to the center of the central support 1 (ie, the longitudinal direction is the radial direction of the central support 1).

Figure 3:
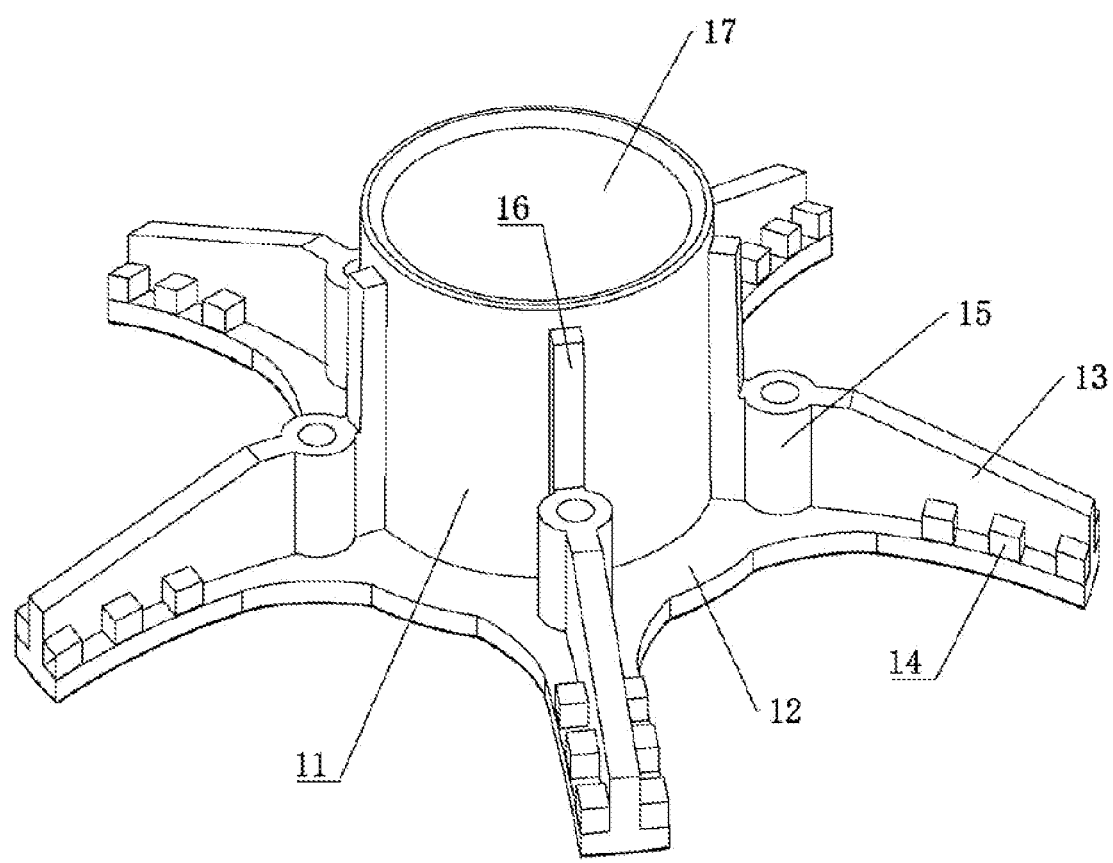
FIG. 3 is a schematic view illustrating the structure of the central support according to an embodiment of the present disclosure.

As shown in FIG. 3, the central support 1 may include a support body 11 and five mount portions 13 integrally connected to the support body 11, and the five mount portions 13 may be evenly distributed around the support body 11. A mount groove 21 may be provided on one side of each of the feet 2, and the notch of the mount groove 21 faces downward along the axial direction of the support body 11. The foot 2 may be buckled on the mount portion 13 from top to bottom through the mount groove 21, so that the mount portion 13 may be embedded in the mount groove 21 in a horizontal direction (in this embodiment, the horizontal direction is the axial direction of the support body 11). A support portion 12 may be provided under the mount portion 13, and the support portion 12 may be used to support the feet 2. The support body 11, the mount portion 13 and the support portion 12 may be integrally formed.

Figure 4:
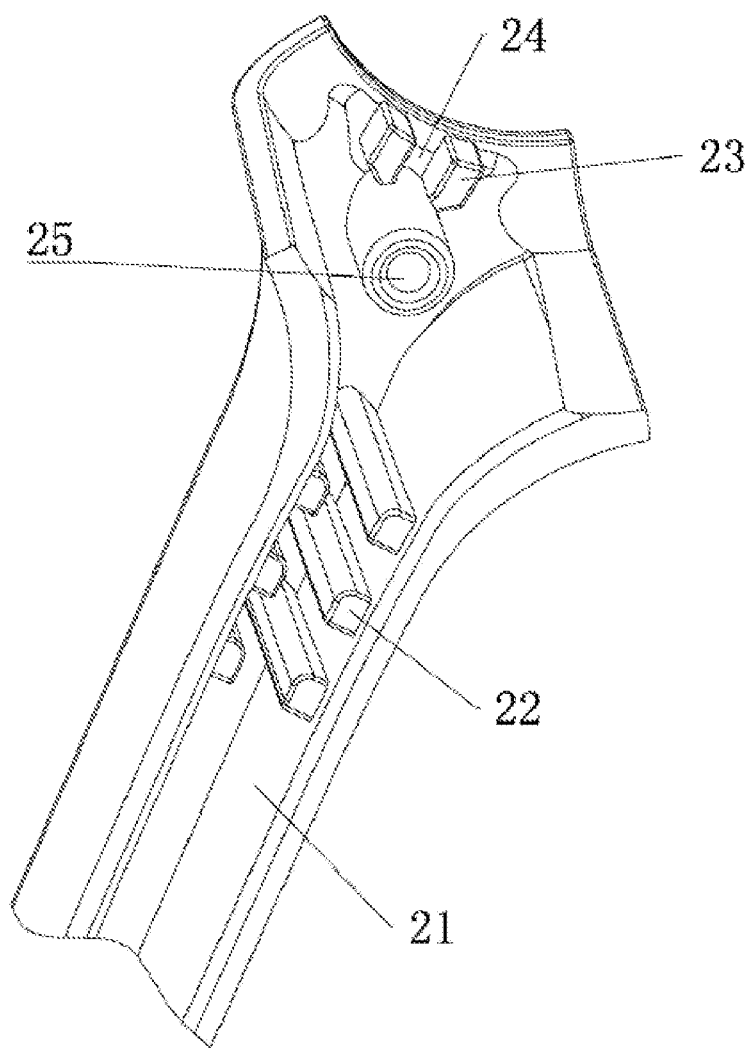
FIG. 4 is a schematic diagram of a three-dimensional structure illustrating a foot according to an embodiment of the present disclosure.

As shown in FIG. 3 and FIG. 4, a fastening assembly may be provided between the foot 2 and the central support 1 to prevent the mount portion 13 from being laterally separated from the mount groove 21. The fastening assembly may include a bolt and a threaded connection portion 25 with an internal threaded hole. The threaded connection portion 25 may be arranged on the foot 2. The bolt passes through the central support 1 from below and is screwed to the threaded connection portion 25. The threaded connection portion 25 may be provided in the mount groove 21, the mount portion 13 may be provided with a bolt positioning portion 15 for abutting on the end of the threaded connection portion 25, and the bolt positioning portion 15 may be provided with an axially penetrating through hole, and the through hole is communicated with the internal threaded hole.

The mount portion 13 may be provided with a plurality of first limit portions 14, the foot 2 may be provided with a plurality of second limit portions 22. The second limit portions 22 may be provided on the groove walls on both sides of the mount groove 21, and the first limit portion 14 may be fixed to corresponding sides of the mount portion 13. In this embodiment, each side of the mount portion 13 may be provided with three first limit portions 14, and the groove wall of each side of the mount groove 21 may be correspondingly provided with three second limit portions 22. During installing, each first limit portion 14 may be located on the outer side of the corresponding second limit portion 22 in the longitudinal direction, and two second limit portions 22 may be clamped between two adjacent first limit portions 14. The first limit portions 14 and the second limit portions 22 cooperate to form a longitudinal limit structure that prevents the foot 2 from escaping from the mount portion 13 in the longitudinal direction. Each of the first limit portion 14 has a block structure, and each of the second limit portion 22 has a strip structure. The mount portion 13 may be clamped between the second limit portions 22 on both sides of the mount groove 21 to prevent the each foot 2 from moving relative to the mount portion 13 in the tangential direction of the central support 1.

As shown in FIG. 3, the outer wall of the support body 11 may be provided with a plurality of guide portions 16 extending from an upper end of the support body 11 to the mount portion 13 axially, and the end of the each of the plurality of the feet 2 may be provided with a slide groove 24 moving in an axial direction along the guide portion 16. As shown in FIG. 4, the mount groove 21 may be provided with guide blocks 23 for clamping on both sides of the guide portion 16. The space between two adjacent guide blocks 23 is the slide groove 24. The bolt positioning portion 15 may be provided outside the guide portion 16, the guide block 23 may be fixed between the support body 11 and the bolt positioning portion 15 in the radial direction.

When each foot is assembled, the guide block 23 at the end of the foot 2 slides along the guide portion 16, and the mount portion 13 of the central support 2 may be embedded in the mount groove 21 of the foot 2 in the axial direction, and at the same time, two of the second limit portions 22 may be buckled between the first limit portions 14 of the mount portion 13 to complete the radial positioning. Then, the bolt passes through the bolt positioning portion 15 from below and then is screwed to the threaded connection portion 25 of the foot 2 to complete the fixed installation of the foot 2 and the central support 1.

In another embodiment, the present disclosure provides a chair including a detachable chair leg according to the above embodiment of the present disclosure, a chair seat and a support rod, wherein the. The upper end of the support rod may be fixed on the bottom of the chair seat, and the lower end may be inserted into the chair leg. The center support 1 of the chair leg may be provided with a center hole 7 in the center, and the lower end of the support rod may be inserted into the center hole 7.

Although the present disclosure has been described in combination with specific embodiments of the present disclosure, based on the foregoing description, many substitutions, modifications and variations of these embodiments will be apparent to those of ordinary skill in the art.

The embodiments of the present disclosure are intended to include all such substitutions, modifications, and variations that fall within the broad scope of the appended claims. Therefore, any omissions, modifications, equivalent substitutions, improvements, etc. made within the spirit and principles of the embodiments of the present disclosure should be included in the protection scope of the present disclosure.

What is claimed is:

1. A detachable chair leg, comprising a plurality of feet and a central support, the central support comprising a support body and a plurality of mount portions fixedly connected to the support body; each of the plurality of feet being provided with a mount groove on one side of the foot, wherein: the mount portion is horizontally embedded in the mount groove, and between the each of the plurality of feet and the central support, a fastening assembly is provided to prevent each of the plurality of mount portions from being laterally separated from the mount groove; the each of the plurality of mount portions is provided with a plurality of first limit portions; the foot is provided with a plurality of second limit portions, at least one of the plurality of the first limit portions is located outside the second limit portions in a longitudinal direction; at least two of the plurality of first limit portions are provided along the longitudinal direction, and at least one of the plurality of second limit portions is clamped between two adjacent first limit portions; the two adjacent first limit portions cooperate with the at least one of the plurality of second limit portions to prevent the foot from removing from the mount portion in the longitudinal direction;

the second limit portions are provided on groove walls on two sides of the mount groove, and the first limit portions are fixed on corresponding two sides of the mount portion;

each first limit portion has a block structure, and each second limit portion has a strip structure;

the mount portion is clamped between the second limit portions on both sides of the mount groove to prevent the foot from moving relative to the mount portion in a tangential direction of the central support.

2. The detachable chair leg according to claim 1, wherein: a notch of the mount groove is downward along an axial direction of the support body, and the foot is buckled on the mount portion from top to bottom via the mount groove.

3. The detachable chair leg according to claim 2, wherein: the central support further comprises a support portion for supporting under the foot, the support portion is arranged below the mount portion.

4. The detachable chair leg according to claim 1, wherein: the fastening assembly comprises a bolt and a threaded connection part with an internal threaded hole; the threaded connection part is provided on the foot, the bolt passes through the central support from below and then is screwed to the threaded connection part.

5. The detachable chair leg according to claim 4, wherein: the threaded connection part is provided in the mount groove; the mount portion is provided with a bolt positioning portion abutting on an end of the threaded connection portion, the bolt positioning portion is provided with an axially penetrating through hole, and the through hole is communicated with the internal threaded hole.

6. The detachable chair leg according to claim 5, wherein: an outer wall of the support body is provided with a plurality of guide portions, and each of the plurality of guide portion extends axially to the mount portion from an upper end of the support body; an end of the each of the plurality of the feet is provided with a slide groove that moves axially along the guide portion.

7. The detachable chair leg according to claim 6, wherein: the mount groove is provided with guide blocks for clamping on both sides of the guide portion, a space located between two adjacent guide blocks is the slide groove; the bolt positioning portion is provided on an outside of the guide portion, and the guide blocks are fixed between the support body and the bolt positioning portion in a radial direction.

8. A chair, comprising the chair leg according to claim 1.

\* \* \* \* \*